United States Patent
Matsubara et al.

[19]

[11] Patent Number: 6,163,203
[45] Date of Patent: *Dec. 19, 2000

[54] VOLTAGE APPLYING APPARATUS FACILITATING ADJUSTMENT OF A DRIVING VOLTAGE FOR A LIGHT SIGNAL EMITTER

[75] Inventors: Ken Matsubara, Takatsuki; Tsukasa Yagi, Kobe; Kenichi Wada, Takatsuki, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/997,652

[22] Filed: Dec. 23, 1997

[30] Foreign Application Priority Data

Dec. 26, 1996 [JP] Japan .................................. 8-347260

[51] Int. Cl.[7] .................................................. H03K 3/037
[52] U.S. Cl. ............................ 327/514; 327/513; 250/205
[58] Field of Search ..................................... 327/512, 513, 327/514, 362; 250/205, 214 C

[56] References Cited

U.S. PATENT DOCUMENTS

| | | | |
|---|---|---|---|
| 3,750,155 | 7/1973 | Oman | 340/870.04 |
| 4,025,440 | 5/1977 | Suga | 250/205 |
| 4,694,157 | 9/1987 | Mishina | 250/214 C |
| 4,700,057 | 10/1987 | Sakai | 250/205 |
| 4,723,554 | 2/1988 | Oman et al. | 128/664 |
| 4,851,954 | 7/1989 | Surig | 361/103 |
| 4,876,442 | 10/1989 | Fukushima | 250/205 |
| 4,939,395 | 7/1990 | Asano et al. | 327/513 |
| 4,947,057 | 8/1990 | Czarnocki et al. | 327/513 |
| 5,036,228 | 7/1991 | Noro | 327/108 |
| 5,327,210 | 7/1994 | Okui et al. | 356/218 |
| 5,414,280 | 5/1995 | Girmay | 257/80 |
| 5,440,520 | 8/1995 | Schultz et al. | 365/226 |
| 5,493,248 | 2/1996 | Dunn et al. | 327/512 |
| 5,521,375 | 5/1996 | Jang | 250/238 |
| 5,894,200 | 4/1999 | Goodale, Jr. et al. | 315/360 |

FOREIGN PATENT DOCUMENTS 63-189269  4/1988  Japan .

*Primary Examiner*—Terry D. Cunningham
*Attorney, Agent, or Firm*—McDermott, Will & Emery

[57] ABSTRACT

A PLZT optical shutter array includes an optical shutter array, a driving circuit, a temperature compensating circuit, an IC control unit, a driving IC and a temperature sensor. Temperature of the optical shutter array is detected by the temperature sensor, and based on a voltage representing the temperature and a reference voltage for driving optical shutter element, a driving voltage for the optical shutter element is generated in the temperature compensating circuit. The driving voltage is applied to the optical shutter element through the IC control unit and a driving IC. As a result, a voltage applying apparatus for a light signal emitter which has a simple structure and allows cost reduction is provided.

25 Claims, 8 Drawing Sheets

VOLTAGE APPLYING APPARATUS FACILITATING ADJUSTMENT OF A DRIVING VOLTAGE FOR A LIGHT SIGNAL EMITTER

BACKGROUND OF THE INVENTION

1. Field of the Invention

The present invention relates to a voltage applying apparatus for driving a light signal emitter. More specifically, the present invention relates to a voltage applying apparatus for driving an optical shutter array.

2. Description of the Related Art

An optical shutter array is used in some image forming apparatuses such as a copying machine or a printer. The optical shutter array includes optical shutter elements each of which is a small pixel unit having an electro-optical effect, and used for exposing a photoreceptor. As light to the photoreceptor is intercepted/passed by the optical shutter element, an image is formed on the photoreceptor. By controlling magnitude of voltage driving the optical shutter element, the amount of exposure of the photoreceptor is adjusted, whereby a halftone image can be represented. An image is formed on a recording sheet based on the image formed on the photoreceptor.

However, the amount of light transmitted through the optical shutter element has temperature dependency. Therefore, when the temperature of the optical shutter element differs, the transmitted light amount differs, even when the driving voltage is kept constant.

FIG. 7 shows temperature dependency of the optical shutter element. Provided that the temperature of the optical shutter element is constant, the transmitted light amount gradually increases as the driving voltage increases, reaches a maximum amount at a certain driving voltage, and thereafter the amount decreases. When curves showing the transmitted light amount corresponding to the driving voltage at various temperature are plotted, it can be understood that the higher the temperature, the larger the driving voltage which maximizes the transmitted light amount (hereinafter, the driving voltage which maximizes the transmitted light amount will be referred to as optimal driving voltage).

A heat generating portion in an image forming apparatus changes ambient temperature, and varies temperature of the optical shutter element. The amount of light transmitted through the optical shutter element varies with the temperature variation, resulting in variation in density of the recorded image. Thus, image quality is considerably deteriorated because of the variation in ambient temperature.

In order to prevent variation in image density caused by temperature variation of the optical shutter element, a technique for detecting temperature of the optical shutter element and changing driving voltage accordingly is disclosed in Japanese Patent Laying-Open No. 63-189269. In the image forming apparatus disclosed in Japanese Patent Laying-open No. 63-189269, a temperature detecting element detects temperature of PLZT optical shutter array and outputs a signal indicative the detected temperature. The signal is subjected to A/D conversion, and based on the A/D converted signal and prescribed data corresponding to the temperature in a ROM, driving voltage for the PLZT optical shutter array is controlled.

However, the optimal driving voltage for the PLZT optical shutter array varies widely, and the optimal driving voltage is different in different PLZT optical shutter array used in image forming apparatus.

FIG. 8 shows variation of optimal driving voltages for two optical shutter arrays. In the graph, the dotted line 201 represents the optimal driving voltage with respect to temperature for a certain optical shutter array, while dotted line 202 represents the optimal driving voltage with respect to temperature for another optical shutter array. The change rate of the optimal driving voltage with respect to time is almost the same in two optical shutter arrays and is about 0.27 V/° C. The solid line 203 represents an average optimal driving voltage for the two optical shutter arrays.

The variation of the optimal driving voltage results from variation in the processed shape of the optical shutter array, and it is difficult to eliminate the variation in processed shape. In order to cope with the problem of variation of the optimal driving voltage, it is necessary to control the driving voltage in accordance with temperature characteristic of individual optical shutter array in each image forming apparatus employing the optical shutter array.

Such variation of individual optical shutter array is not addressed in the image forming apparatus disclosed in the aforementioned Japanese Patent Laying-Open No. 63-189269. Therefore, it is necessary to rewrite prescribed data in the ROM for controlling the driving voltage of the optical shutter array which corresponds to the signal from the temperature detecting element, for each image forming apparatus having optical shutter array of different temperature characteristic.

However, rewriting of data in the ROM individually for each image forming apparatus increases manufacturing cost. Further, in the above described image forming apparatus, the signal indicative of the temperature has to be A/D converted, which leads to complicated circuit structure.

SUMMARY OF THE INVENTION

Therefore, an object of the present invention is to provide a voltage applying apparatus for a light signal emitter, which has simple structure and allows reduction in manufacturing cost.

Another object of the present invention is to provide a voltage applying apparatus for a light signal emitter, which facilitates adjustment, has simple structure and allows reduction in manufacturing cost.

A still further object of the present invention is to provide a voltage applying apparatus for a light signal emitter, which does not require complicated circuit structure and allows adjustment in accordance with temperature characteristic in a simple manner.

A still further object of the present invention is to provide a method of applying a voltage to a light signal emitter, which is simple and allows manufacturing cost.

The above described objects of the present invention is attained by a voltage applying apparatus for applying a driving voltage to a light signal emitter, including: a first unit for generating a first voltage, the first voltage varying depending on temperature of the light signal emitter; a second unit connected to said first unit, the second unit converting the first voltage into a second voltage in accordance with a temperature characteristic of the light signal emitter; and a third unit connected to the second unit and receiving a third voltage, the third unit converting the third voltage into a fourth voltage based on the second voltage and applying the first voltage to the light signal emitter as the driving voltage.

The voltage for driving the light signal emitter is generated based on a voltage generated in accordance with the temperature of the light signal emitter and adjusted in accordance with the temperature characteristic of the emitter. Accordingly, necessity of the conventional complicated circuit structure required for A/D conversion can be eliminated. Further, it is unnecessary to rewrite the content of the ROM in accordance with the temperature characteristic, adjustment in accordance with the temperature characteristic of the light signal emitter is facilitated, the structure can be simplified and therefore manufacturing cost can be reduced.

Preferably, the relation between the fourth voltage and the temperature of the light signal emitter is expressed as a linear equation.

Since the relation between the driving voltage for the light signal emitter and the temperature of the light signal emitter is represented in a linear equation, adjustment of the voltage applying apparatus is facilitated.

According to another aspect of the present invention, the method for applying a driving voltage to a light signal emitter includes: a first step of providing a temperature sensor to the light signal emitter; a second step of adjusting sensitivity of the temperature sensor and an offset value of the temperature sensor by a first analog adjuster and a second analog adjuster, respectively; a third step of outputting an analog signal from the temperature sensor after the adjustments of the second step; a fourth step of adjusting a drive voltage input from an external voltage source based on the analog signal; and a fifth step of outputting the adjusted drive voltage to the light signal emitter.

A temperature sensor is provided for the light signal emitter, and sensitivity and set value of the temperature sensor are adjusted based on a signal from adjusted temperature sensor, driving power is applied to the light signal emitter. Therefore, a method of supplying voltage for driving light signal emitter can be provided which is simple and allows cost reduction, while eliminating the conventional complicated circuit and rewriting of the ROM.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A PLZT optical shutter array driving circuit, which is one embodiment of the present invention, will be described with reference to the figures.

Figure 1:
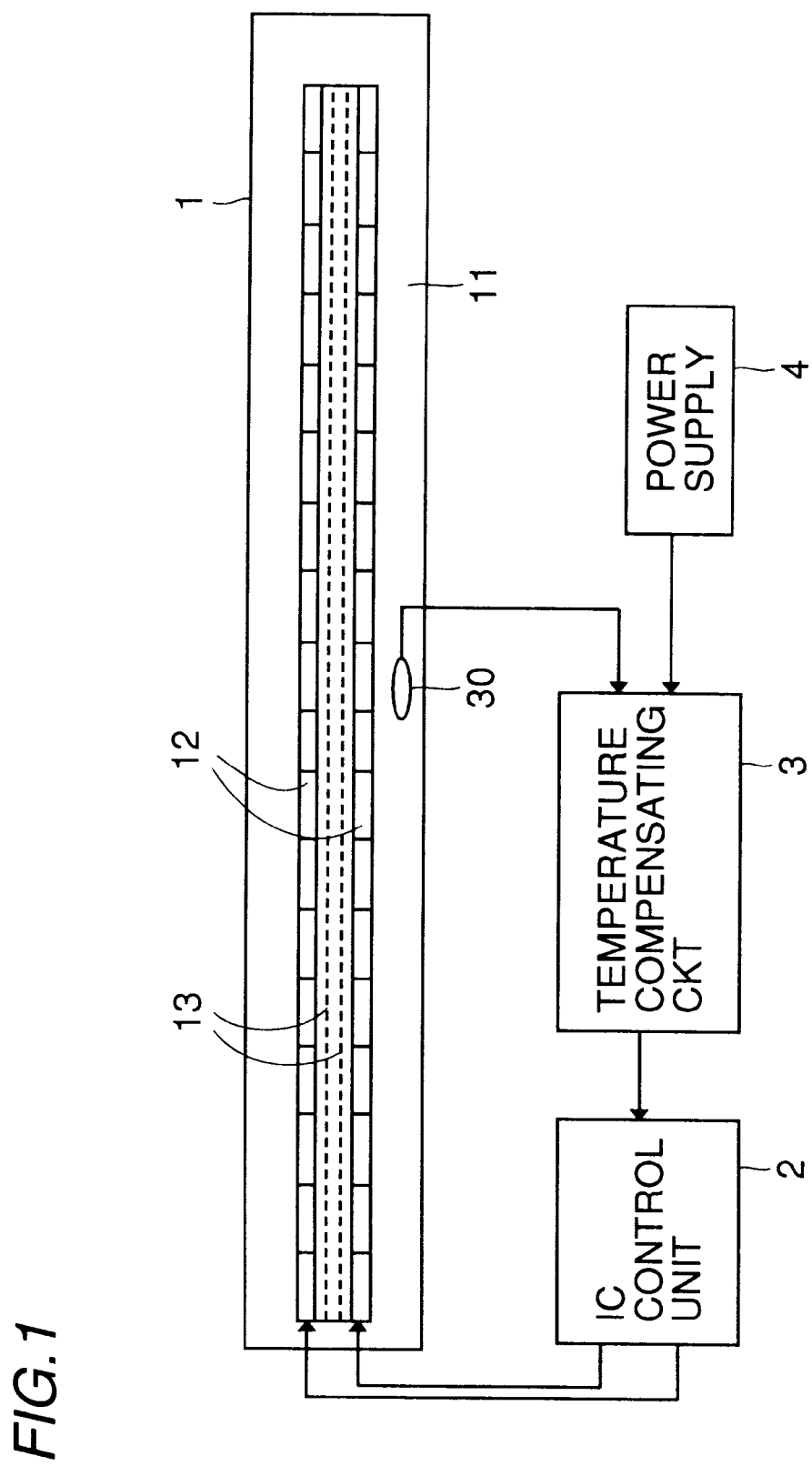
FIG. 1 shows an overall structure of a PLZT optical shutter array driving circuit which is an embodiment of the present invention.

Referring to FIG. 1, PLZT optical shutter array driving circuit includes an IC control unit 2 for controlling an optical shutter element 13, a temperature compensating circuit 3 for compensating voltage driving optical shutter element 13 in accordance with the detected temperature, and a power source 4. A module 1 of the optical shutter array includes, on a substrate 11, optical shutter elements 13 arranged in two lines, a driving IC 12 for driving each optical shutter element 1, and a temperature sensor (thermister) 30 for detecting temperature.

A signal indicative of temperature near optical shutter element 13 detected by optical sensor 30 is input to temperature compensating circuit 3. In temperature compensating circuit 3, the voltage VD for driving the optical shutter element is controlled so that it is adjusted to the optimal driving voltage for the temperature, and input to IC control unit 2.

Optical shutter element 13 is controlled and driven in the following manner.

Figure 2:
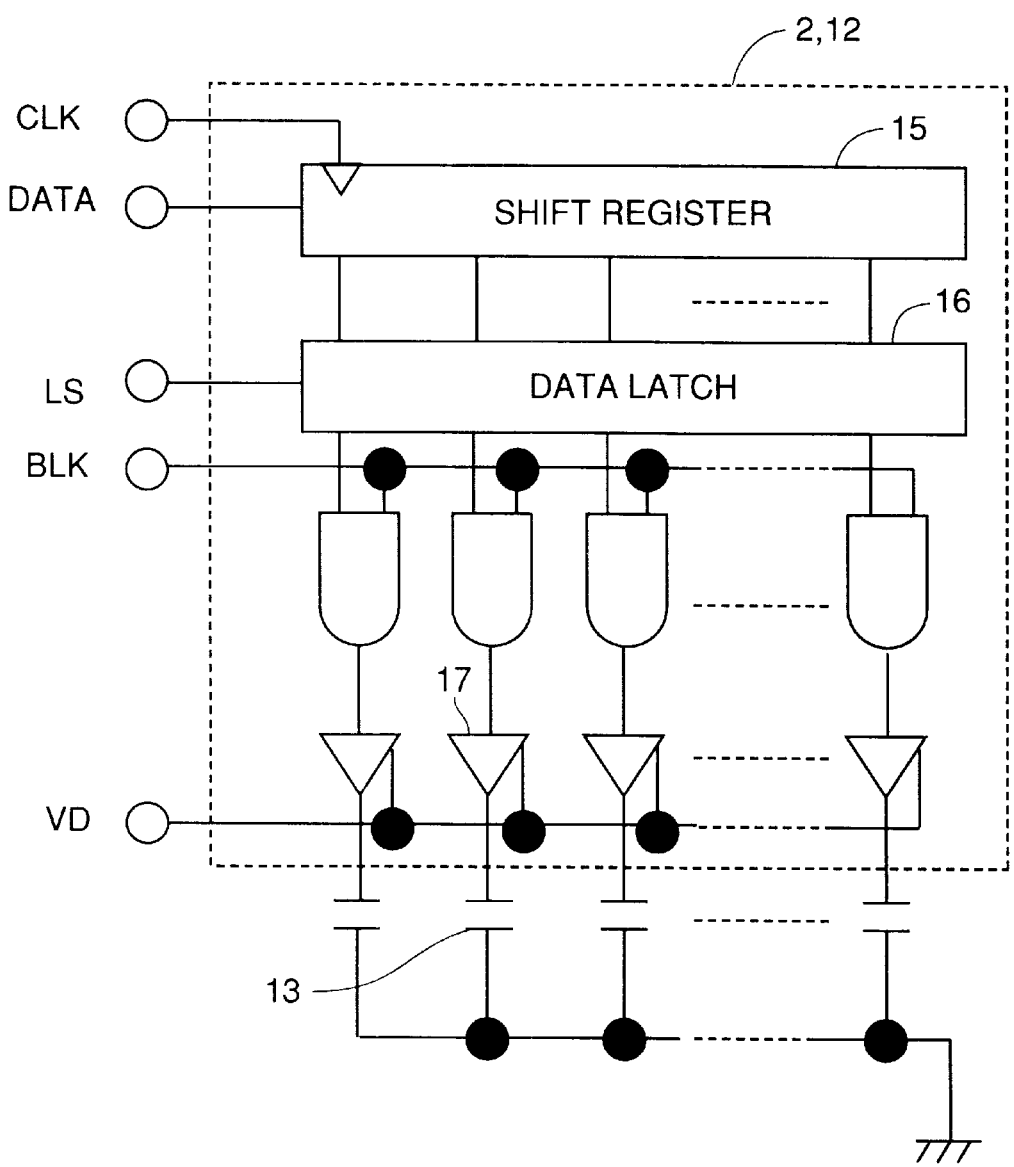
FIG. 2 is an illustration showing details of control of the optical shutter element by a part of an IC control unit 2 and an IC12 for driving.

FIG. 2 is an illustration showing details of control of optical shutter element 13 by a part of IC control unit 2 and IC 12 for driving.

Image data DATA is transmitted in synchronization with a clock signal CLK to a shift register 15. The data DATA is latched by a DATA latch circuit 16 by a latch strobe signal LS. A blank signal BLK used for controlling timing of transmitting latched data to a high voltage driver 17, is turned ON/OFF, a high voltage pulse is applied to each optical shutter element 13 by the high voltage driver 17 in accordance with a signal in DATA latch circuit 16, so that ON/OFF of each optical shutter element is controlled.

Temperature compensating circuit 3 shown in FIG. 1 will be described.

Figure 3:
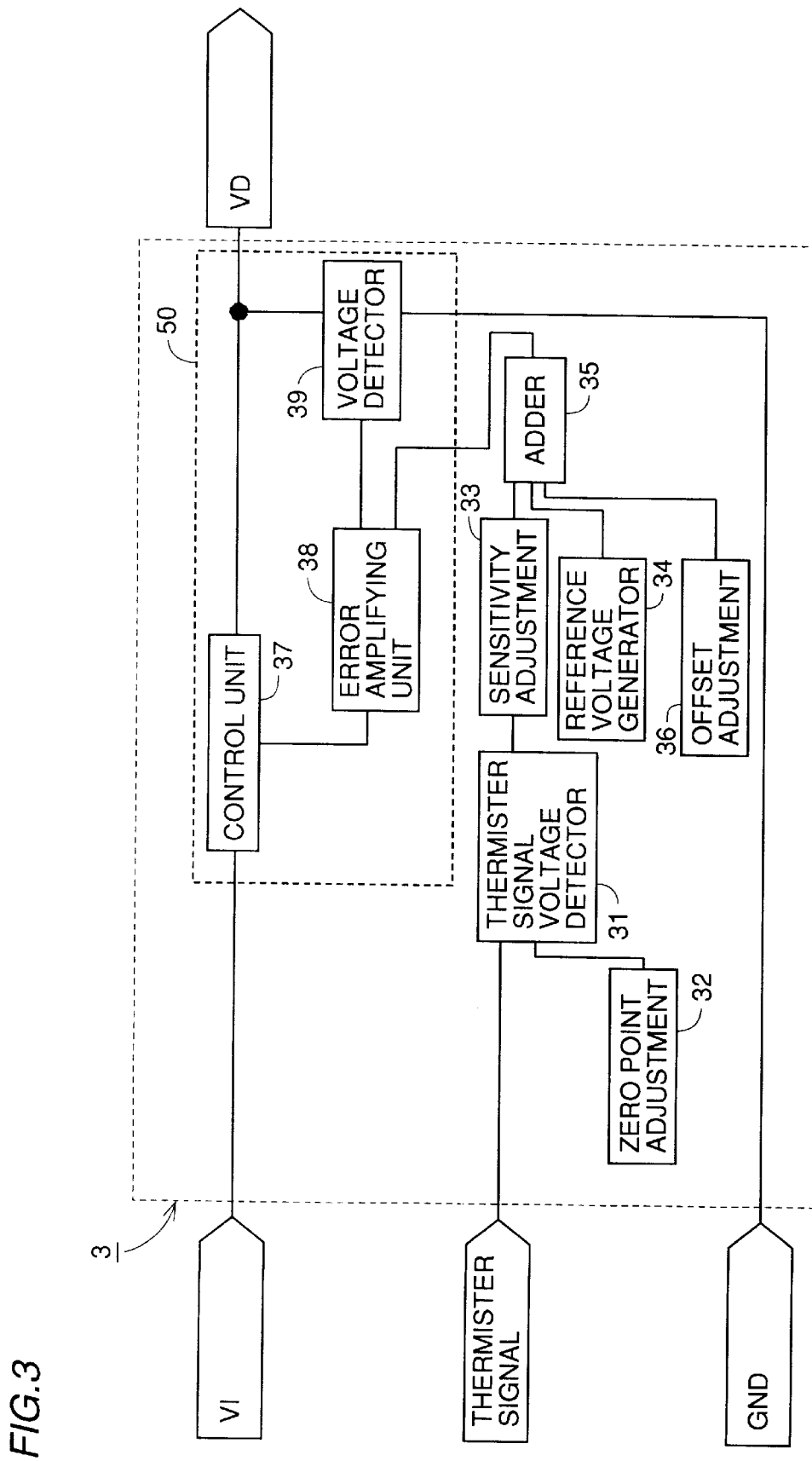
FIG. 3 is a block diagram showing schematic concept of temperature compensation control performed by a temperature compensating circuit.

FIG. 3 is a block diagram showing overall concept of temperature compensation control performed by temperature compensating circuit 3.

A signal voltage from thermister 30 which is detected by a thermister signal voltage detector 31 and having its sensitivity adjusted by a sensitivity adjusting unit 33 is added to a reference voltage generated by a reference voltage generator 34 in an adder 35. A voltage which is the sum of the signal voltage from thermister 30 and the reference voltage is output from adder 35. By this output voltage, an input voltage VI from power source 4 is controlled at control unit 37, and a driving voltage VD for the optical shutter array module 1 is output from control unit 37. A zero point adjusting unit 32 adjusts zero point of thermister signal voltage detector 31. An offset adjusting unit 36 adjusts offset of an operational amplifier 24 used in adder 35. A stabilizing power supply circuit unit 50 including control unit 37, an error amplifying unit 38 and a voltage detector 31 in temperature compensating circuit 3 has a function of stabilizing the driving voltage VD to be output with respect to variation of input voltage VI.

Figure 4:
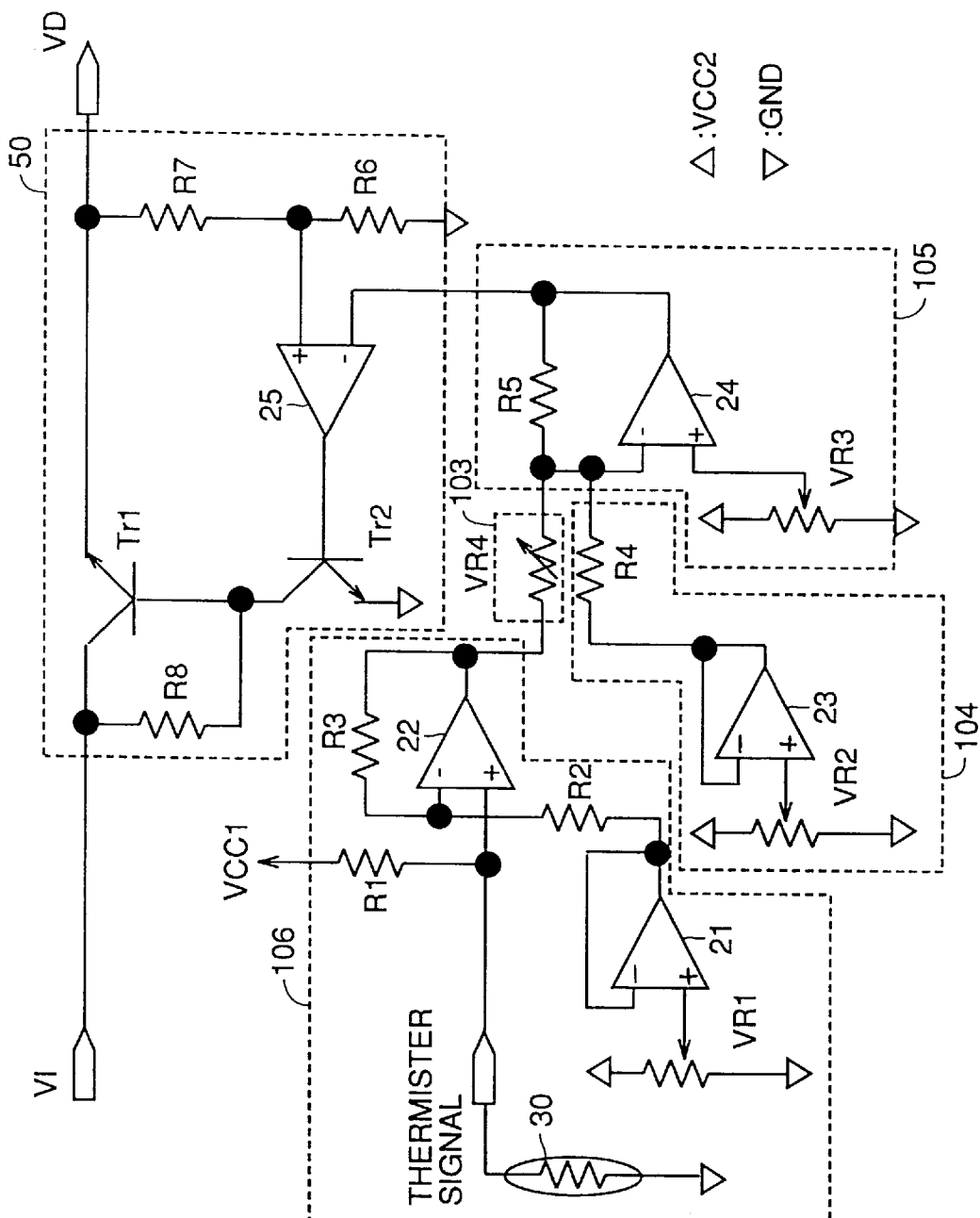
FIG. 4 is a circuit diagram of the temperature compensating circuit.

FIG. 4 is a circuit diagram of temperature compensating circuit 3 corresponding to FIG. 3. Each of control blocks shown in FIG. 3 corresponds to a circuit element which will be described in the following, and these circuit elements constitute temperature compensating circuit 3 shown in FIG. 4.

Control unit 37 corresponds to a resistor R8 and a transistor Tr1. Error amplifying circuit 38 corresponds to a transistor Tr2 and an operational amplifier 25. Voltage detector 39 corresponds to resistors R6 and R7. Stabilizing power source circuit unit 50 including control unit 37, error amplifying unit 38 and voltage detector 39 corresponds to stabilizing power supply circuit 51. Zero point adjusting unit 32 and thermister signal voltage detector 31 correspond to a thermister signal voltage detecting circuit 106 including a variable resistor VR1, an operational amplifier 21, resistors R1, R2, R3 and an operational amplifier 22, and sensitivity adjusting unit 33 corresponds to a sensitivity adjusting circuit 103 including a variable resistor VR4. Reference voltage generator 34 corresponds to a reference voltage generating circuit 104 including a variable resistor VR2, a resistor 4 and an operational amplifier 23. Offset adjusting unit 36 and adder 35 correspond to an adder circuit 105 including a variable resistor VR3, resistor R5 and an operational amplifier 26.

Principal of operation of temperature compensating circuit 3 will be described with reference to FIG. 4. When we represent voltage value of an inverted input to operational amplifier 25 as Vr1, driving voltage VD is given as VD=Vr1×(1+R7/R6). At this time, stable control is possible when the input voltage VI to the control unit is higher by at least 5V than the desired driving voltage VD. For example, assuming that output from operation amplifier 24 is 5V, (1+R7/R6)=10 and VI≧55V, then VD operates as a stabilizing power supply of 50V. The value Vr1 changes in accordance with the temperature characteristic of the optical shutter element. Under such control, VD as the optimal driving voltage for respective temperature is provided.

Figure 5:
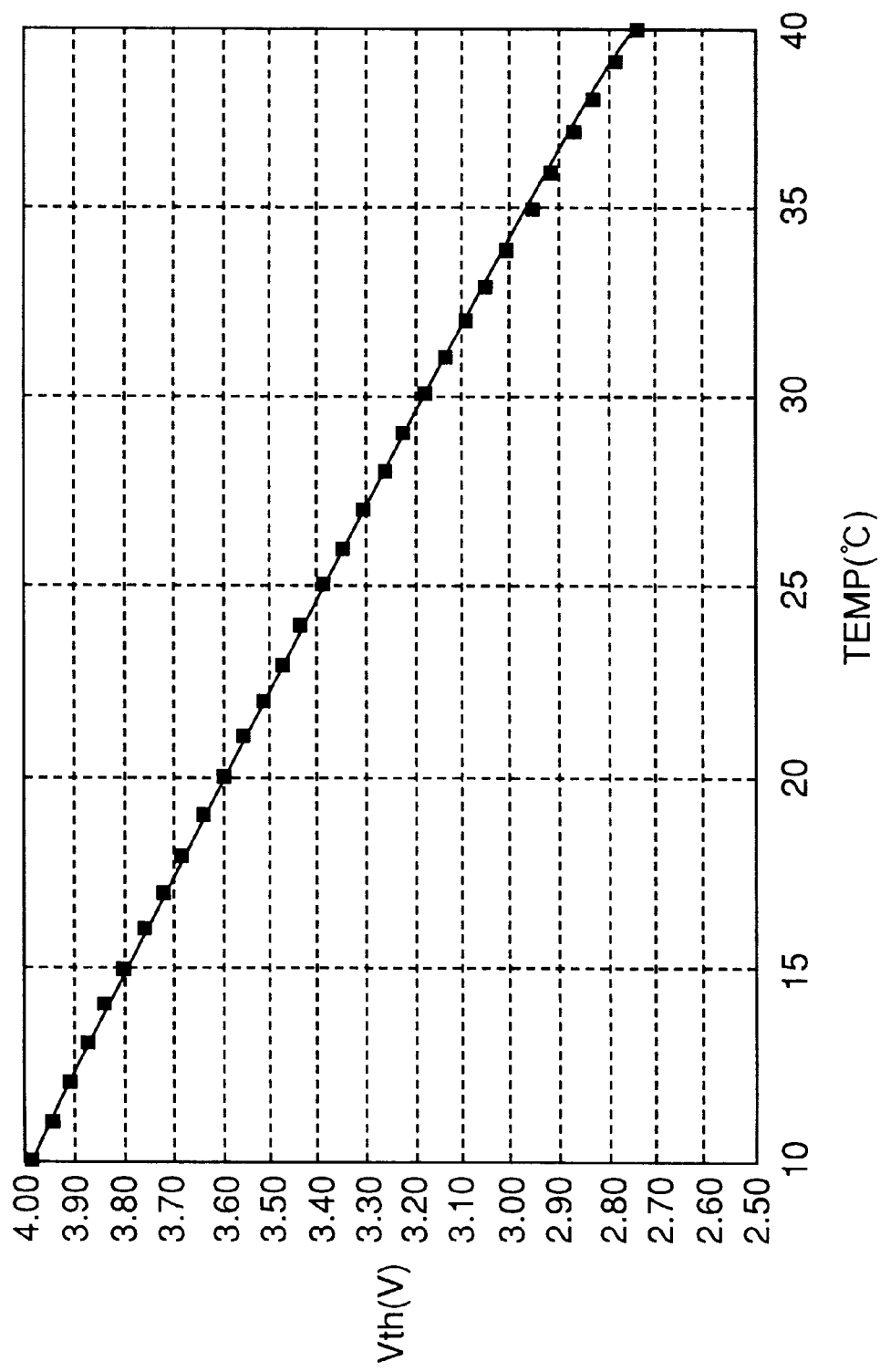
FIG. 5 is a graph showing change in a thermister signal voltage Vth with respect to temperature.

Assuming that a thermister having B constant of 3450 and resistance value at 25° C. of 10 kΩ is used as thermister 30, resistor R1 has resistance value of 4.7 kg and a voltage Vcc of 5V is applied to resistor R1, then the change in thermister signal voltage Vth with temperature is as shown in FIG. 5. Thermister signal voltage Vth decreases by about 0.2V when the temperature increases by 5° C., within the temperature range of 10 to 40° C.

Specific method of setting voltage value in temperature compensating circuit 3 will be described. Here, an optical shutter array of which optimal driving voltage at 25° C. is 50V is used. Further, it is assumed that R2=R3=R4=R5=10 kΩ.

Setting 1: by variable resistor VR3, voltage at a non-inverting input terminal of operational amplifier 24 is adjusted to 5V.

Setting 2: by variable resistor VR2, output of operational amplifier 23 is adjusted to 5V.

Setting 3: by variable resistor VR1, output of operational amplifier 21 is adjusted to 1.8V.

Setting 4: value of variable resistor VR4 is adjusted to 30.6 kg.

In setting 3, the output of operational amplifier 21 is set to 1.8V, in order that output voltage of operational amplifier 22 attains to 5V when the thermister signal voltage Vth at 25° C. is 3.4V. At this time, current does not flow to variable resistor VR4, and therefore, the output voltage of operational amplifier 24 is kept at 5V. As a result, the driving voltage VD assumes 50V.

When the thermister signal voltage Vth attains lower than 3.4V as the thermister temperature increases, the output voltage of operational amplifier 22 decreases, the output voltage from operational amplifier 24 increases and the driving voltage VD also increases. By contrast, when the thermister signal voltage Vth becomes higher than 3.4V as the thermister temperature decreases, the output voltage of operational amplifier 22 increases, the output from operational amplifier 24 decreases and the driving voltage also decreases.

Figure 8:
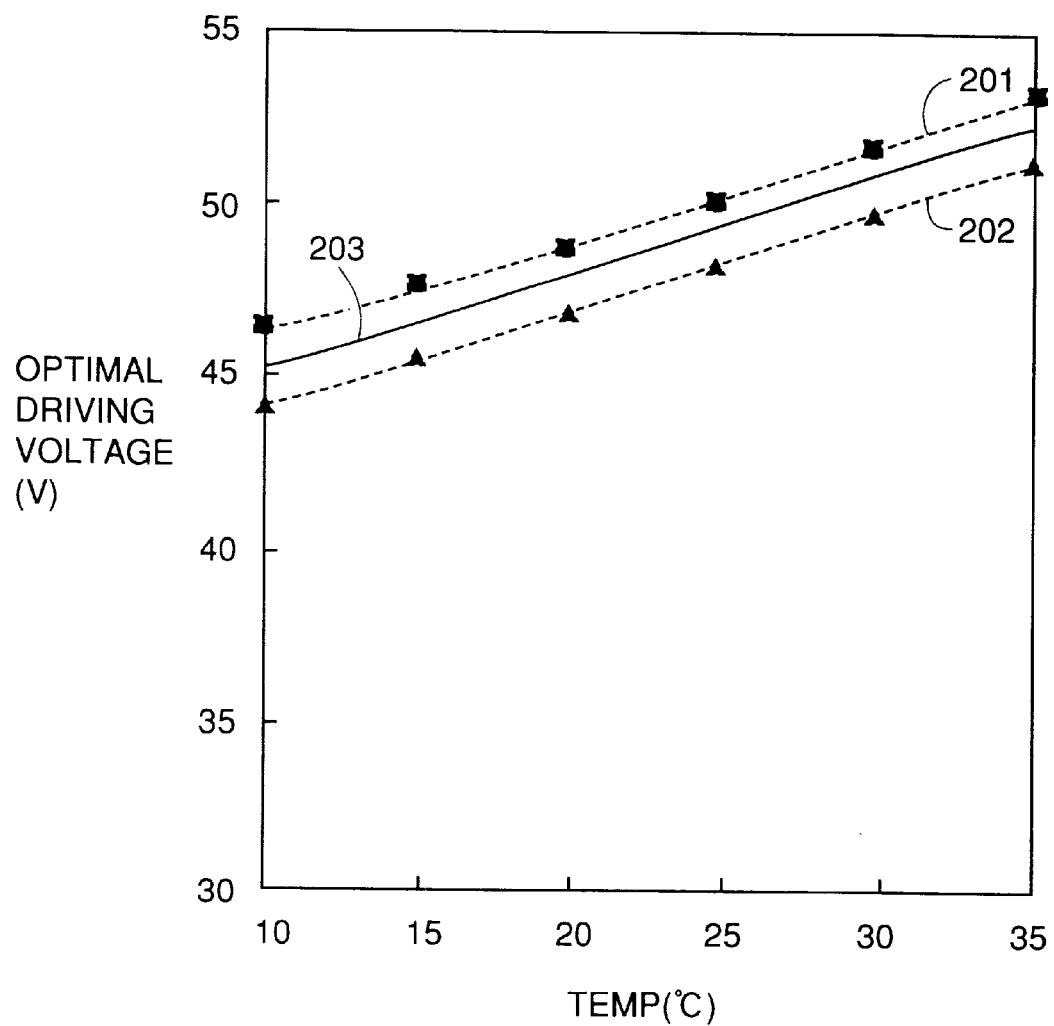
FIG. 8 shows variations of optimal driving voltages of two optical shutter arrays.

The rate of change of the driving voltage VD with respect to the temperature change is determined by VR4. It has been known that the rate approximately matches the inclination or slope of temperature characteristic represented as a linear function of line 203 in the graph of FIG. 8 when VR4 is 30.6 kg. Though optimal driving voltage at 25° C. differs array by array because of variation of temperature characteristics of the optical shutter array, once the optimal driving voltage at 25° C. is set by adjusting variable resistor VR2 of reference voltage generating circuit 104 for the optical shutter array, the driving voltage changes with time while keeping a prescribed inclination. More specifically, by adjusting resistance value of variable resistance VR2, the offset of the aforementioned linear function is adjusted.

Therefore, temperature compensation of the driving voltage is possible simply by adjusting the optimal driving voltage at a room temperature (25° C.) for the optical shutter array used in the individual image forming apparatus.

Figure 6:
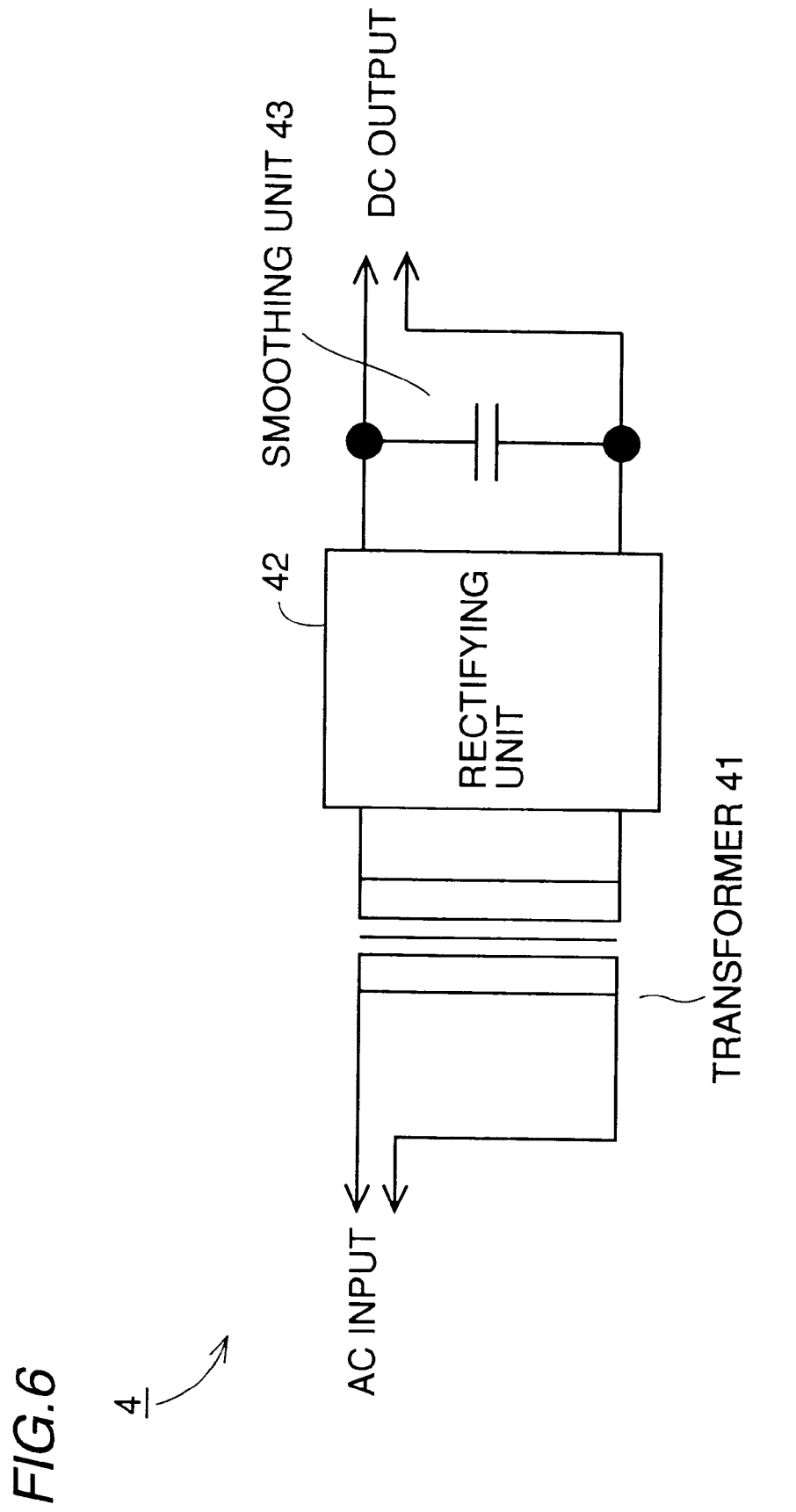
FIG. 6 shows a structure of a power supply.
Figure 7:
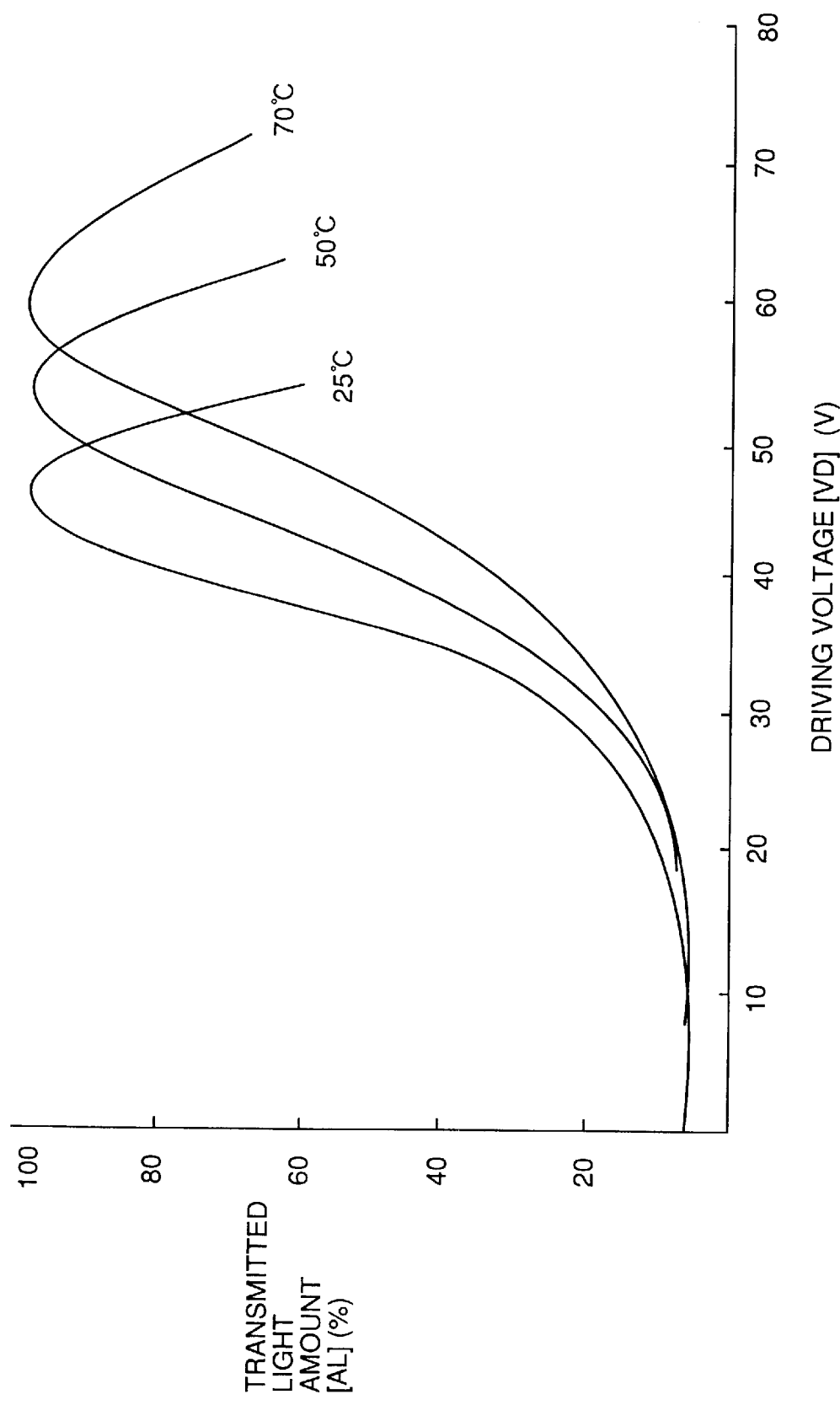
FIG. 7 is a graph showing temperature dependency of the optical shutter element.

Further, use of temperature compensating circuit 3 simplifies the structure of power supply 4 (see FIG. 1). FIG. 6 shows structure of power supply 4. Power supply 4 is a simple power source consisting only of a transformer 41, a rectifying unit 42 and a smoothing unit 43. Power supply 4 may be such a simple power source, since control unit 37, error amplifying unit 38 and voltage detector 39 of temperature compensating circuit 3 function as the stabilizing power supply circuit, as described above.

In the PLZT optical shutter array including such a temperature compensating circuit as described above, a complicated circuit structure requiring A/D conversion as in the prior art is not necessary. Further, it is not necessary to rewrite content of the ROM in accordance with the temperature characteristic. Adjustment of light signal emitter in accordance with its temperature characteristic is facilitated, the structure can be simplified and manufacturing cost can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voltage applying apparatus for applying a driving voltage to a light signal emitter, comprising:
    a first unit for generating a first voltage, said first voltage varying depending substantially on temperature of said light signal emitter;
    a second unit connected to said first unit, said second unit converting the first voltage, which depends on said temperature of said light signal emitter, into a second voltage that depends on said temperature of said light signal emitter so that the temperature dependency of the second voltage meets a temperature characteristic of said light signal emitter; and
    a third unit connected to said second unit, said third unit receiving a third voltage and converting the third voltage into a forth voltage based on the second voltage and applying the fourth voltage to said light signal emitter as the driving voltage.

2. The voltage applying apparatus as claimed in claim 1, wherein a relation between the fourth voltage and the temperature of the light signal emitter is expressed as a linear equation.

3. The voltage applying apparatus as claimed in claim 2, wherein said second unit includes an adjusting unit by which a slope of the linear equation is varied.

4. The voltage applying apparatus as claimed in claim 3, wherein said adjusting unit includes a resistor.

5. The voltage applying apparatus as claimed in claim 4, wherein said resistor is connected with said first unit and said third unit in serial.

6. The voltage applying apparatus as claimed in claim 4, wherein said resistor is a variable resistor.

7. The voltage applying apparatus as claimed in claim 2, wherein said second unit includes an adjusting unit by which an offset value of the linear equation is varied.

8. The voltage applying apparatus as claimed in claim 7, wherein said adjusting unit includes a resistor.

9. The voltage applying apparatus as claimed in claim 1, wherein said light signal emitter is electrically equivalent to a condenser.

10. The voltage applying apparatus as claimed in claim 8, wherein said resistor is a variable resistor.

11. The voltage applying apparatus as claimed in claim 1, wherein said first unit includes a thermister.

12. A voltage applying apparatus for applying a driving voltage to a light signal emitter, comprising:

a temperature sensing unit for sensing temperature of the light signal emitter and for outputting an analog signal in accordance with temperature of the light emitting element;

an adjusting unit for adjusting sensitivity of said temperature sensor by a first analog adjuster, and for adjusting an offset value of said temperature sensor by a second analog adjuster; and a controller for adjusting a drive voltage input from an external voltage source based on the adjusted analog signal adjusted by said adjusting unit and for outputting the adjusted drive voltage to the light signal emitter.

13. The voltage applying apparatus as claimed in claim 12, wherein said first analog adjuster is a resistor.

14. The voltage applying apparatus as claimed in claim 13, wherein said resistor is connected with said temperature sensing unit and said controller in serial.

15. The voltage applying apparatus as claimed in claim 13, wherein said resistor is a variable resistor.

16. The voltage applying apparatus as claimed in claim 12, wherein said second analog adjuster comprises a resistor.

17. The voltage applying apparatus as claimed in claim 16, wherein said resistor is a variable resistor.

18. The voltage applying apparatus as claimed in claim 12, wherein said temperature sensing unit includes a thermister.

19. A method of applying a driving voltage to a light signal emitter, comprising:

a first step of providing a temperature sensor for the light signal emitter;

a second step of adjusting sensitivity of the temperature sensor and an offset value of the temperature sensor by a first analog adjuster and a second analog adjuster, respectively;

a third step of outputting an analog signal from said temperature sensor after the adjustments of the second step, said analog signal depending substantially on the temperature of the light signal emitter;

a fourth step of adjusting a drive voltage input from an external voltage source based on the analog signal; and a fifth step of outputting the adjusted drive voltage to the light signal emitter.

20. The method as claimed in claim 19, wherein a relation between the drive voltage and the temperature sensor is expressed by a linear equation, and wherein a slope of the linear equation is adjusted by said first analog adjuster, and an offset of the linear equation is adjusted by said second analog adjuster.

21. The voltage applying apparatus as claimed in claim 19, wherein said second step is executed in accordance with a predetermined temperature.

22. The method as claimed in claim 21, wherein said predetermined temperature is a room temperature.

23. A voltage applying apparatus for applying a driving voltage to an element, comprising:

a first unit for generating a first voltage, said first voltage varying depending substantially on temperature of said element;

a second unit connected to said first unit, said second unit converting the first voltage depending on said temperature of said element into a second voltage depending on said temperature of said elements so that the temperature dependency of the second voltage meets a temperature characteristic of said element; and a third unit connected to said second unit, said third unit receiving a third voltage and converting the third voltage into a fourth voltage based on the second voltage and applying the fourth voltage to said element as the driving voltage.

24. The voltage applying apparatus as claimed in claim 23, wherein said element is an imaging element.

25. The voltage applying apparatus as claimed in claim 23, wherein said element is electrically equivalent to a condenser.

* * * * *